United States Patent
Fuller

(10) Patent No.: US 6,775,546 B1
(45) Date of Patent: Aug. 10, 2004

(54) MOBILE TELEPHONE SYSTEM

(75) Inventor: Martin John Fuller, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/762,096

(22) PCT Filed: Jul. 30, 1999

(86) PCT No.: PCT/GB99/02491

§ 371 (c)(1),
(2), (4) Date: Feb. 2, 2001

(87) PCT Pub. No.: WO00/13449

PCT Pub. Date: Mar. 9, 2000

(30) Foreign Application Priority Data

Sep. 1, 1998 (EP) ............................................ 98307006

(51) Int. Cl.[7] ................................................ H04Q 7/20
(52) U.S. Cl. ...................... 455/445; 455/445; 455/463; 455/518; 379/211.01
(58) Field of Search .............................. 455/414.1, 416, 455/417, 445, 461, 462, 463, 518, 432.1, 426.1, 406; 379/211.01, 211.02

(56) References Cited

U.S. PATENT DOCUMENTS

| | | | | |
|---|---|---|---|---|
| 5,222,123 A | * | 6/1993 | Brown et al. ................ | 455/417 |
| 5,329,578 A | * | 7/1994 | Brennan et al. ........ | 379/211.03 |
| 5,454,032 A | * | 9/1995 | Pinard et al. .......... | 379/167.05 |
| 5,506,888 A | * | 4/1996 | Hayes et al. ................. | 455/445 |
| 5,509,053 A | * | 4/1996 | Gowda et al. ............... | 455/465 |
| 5,943,620 A | * | 8/1999 | Boltz et al. .................. | 455/445 |

* cited by examiner

Primary Examiner—Lee Nguyen
Assistant Examiner—Un C Cho
(74) Attorney, Agent, or Firm—Nixon & Vanderhye P.C.

(57) ABSTRACT

A mobile cellular telephone network is arranged such that calls are routed to a selected member of a group of handsets associated with a single number. The handset to which the call is routed is selected according to the current locations of the handsets, preference being given to handsets currently located within a predetermined cell or group of cells. This allows calls to be automatically routed to whichever handset is currently located in a cell where call tariffs are most favorable. Diversion arrangements can be made to allow calls to be re-routed when none of the handsets is detected within the specified group of cells.

12 Claims, 3 Drawing Sheets

MOBILE TELEPHONE SYSTEM

BACKGROUND

This invention relates to cellular mobile telephone systems, and in particular to such systems of the type in which the mode of operation of a mobile telephone handset, and the services available to it, are varied according to the cell in which the handset is located. In a cellular radio network, mobile telephone handsets are capable of making and receiving telephone calls by way of a radio connection with any one of a network of radio base stations, connected to a switching centre and thus to the rest of the telephone network. On call set-up the network identifies the location of the handset, (as will be described in more detail with reference to FIG. 2) and establishes radio communication between the mobile handset and the base station providing the handset with the best quality radio connection. (This is generally the nearest base station, but differences in transmitter power, directionality of antennas, and local topography may cause a more distant base station to be selected). A geographical zone can therefore be defined for each radio base station, within which any mobile handset will generally communicate with that base station rather than with its neighbours. This zone is known as a "cell".

Proposals have been made, for example in International Patent Specification WO97/13387 (Telia AB), for so-called "Home Zone" services. In such services the user is charged at a reduced rate (typically equivalent to the tariff for making fixed-line calls) when making outgoing calls from a mobile handset operating within a designated "Home Zone", usually defined as one or more cells of the cellular system. In other words, when calls are made through a specified radio base station (or one of several such radio base stations) a reduced tariff operates. Outgoing calls made from a cell outside the Home Zone are charged at normal cellular rates. The user may be given an audible or visual indication on his handset as to whether the current location of the mobile handset is within the "Home Zone".

Incoming calls (calls made to the mobile handset) are made, as for any cellular mobile telephone, using its directory number, known as its MSISDN (Mobile Station Integrated Services Digital Network) number. All such incoming calls would still be charged to the calling party at the normal tariff for making calls to cellular telephones, whether or not the handset is within the "Home Zone".

This service allows a user to use his mobile telephone within a defined area (typically, at or near his home), paying call charges similar to those charged for use of a fixed telephone. This gives a service, which, from the subscriber's viewpoint, is similar to a dual mode cellular/cordless, telephone, but without the need to provide a dual-mode handset or a dedicated cordless base station. (A cordless telephone is a radio handset arranged to communicate with a dedicated radio base station connected to a fixed line). The user may indeed choose to dispense with a fixed line, saving himself (and the telecommunications service provider) the cost of its provision.

However, although convenient to the subscriber himself, such an arrangement requires callers to that subscriber to make a call to his MSISDN number, which is charged to the calling party at a call-to-cellular tariff. These tariffs are generally expensive.

Arrangements have been proposed in which the mobile handset can be contacted using either the MSISDN or a "virtual" fixed-line number. This "virtual" number appears to the caller, and to the caller's billing system, as an ordinary fixed line, but it is not associated with a physical fixed line connection. Instead, there is an association in the switching network between this number and the MSISDN, such that incoming calls made to the virtual fixed-line number are translated to the MSISDN number. Effectively, there is a permanent call-forwarding arrangement from the virtual fixed-line number to the MSISDN number.

The calling party can therefore use the fixed line number to contact the subscriber on his mobile handset, with the advantage of only being charged at a fixed line tariff. If the mobile handset is within the Home Zone there is no extra charge to the subscriber. If the mobile user is outside the Home Zone the call may still be sent to the mobile handset, with an additional charge for accepting calls when outside the Home Zone being charged to the mobile subscriber's account. The mobile subscriber may instead arrange for incoming calls to be forwarded to an answering service service. In this arrangement the calling party always perceives a service and tariff similar to that which would be provided if there were a real fixed-line connection, with calls forwarded to the mobile user (the called party) at his own expense when away from the Home Zone. Whilst in the Home Zone the mobile user also perceives a service and tariff similar to that which would be provided if there were a real fixed-line connection, and bears the additional costs of both incoming and outgoing calls when outside that zone.

This arrangement is in some ways analagous to the "roaming" arrangements provided to allow a subscriber to one cellular network to use his telephone in an area served by another network: the home network corresponding to the "Home Zone".

A common feature of many domestic fixed and cordless telephone installations is the provision of multiple handsets, allowing calls to be made and answered in any part of a building, and allowing two or more members of the household to take part in the same call. It is desirable to be able to provide this capability in the Home Zone service described above. In particular it is desirable to arrange that the virtual fixed-line capability is not lost if one of the handsets is taken out of the Home Zone. This allows calls to be made between the mobile user and another member of the household who may have remained at home.

A first aspect of the invention provides a mobile telephone network operating system for controlling the operation of a mobile telephone network having a plurality of mobile handsets and a plurality of base stations for serving the mobile handsets, the operating system comprising means for identifying the base station currently serving a mobile handset, and means for selectively routing incoming calls to the mobile handset or to another destination according to the location of the handset, wherein a plurality of handsets are associated with a single directory number, and a corresponding set of one or more radio base stations is associated with the directory number, and the network operating system comprises routing means for selectively routing call attempts to the directory number to one or more of the said plurality of handsets currently being served by radio base stations in the said set.

Another aspect provides a method of operating a mobile telephone system, the mobile telephone system having a plurality of mobile handsets and a plurality of base stations for serving the mobile handsets, and wherein there are a plurality of handsets associated with a single directory number, the method being characterised in that a predetermined set of the plurality of radio base stations is associated with the directory number and incoming calls to said directory number are selectively routed to one or more of the said plurality of handsets currently served by radio base stations in the set.

The set of base stations may comprise a single base station. Calls may be diverted to another destination if no handset is currently served by the predetermined set of base stations. This other destination may be an answering system, a predetermined divert number, or one or more of the mobile handsets.

The service can replace a fixed line telephone with two or more mobile handsets, which can each act as the fixed line telephone for both incoming and outgoing calls even if the other is absent or switched off. Although the service can emulate a fixed line telephone by defining the same "Home Zone" (set of base stations) for each handset, the invention also covers arrangements in which each of the handsets has a different Home Zone specified for it.

Each handset may be allocated a unique priority rating, the routing means being arranged to route calls only to the handset having the highest priority rating, of those currently served by the base stations defining its Home Zone. The relative priority ratings of the handsets may be changeable by the users.

This invention extends the benefits of the Home Zone service described above by adding one or more extra mobile handsets, each accessible using the same virtual fixed-line directory number. In particular it can be arranged for calls to the common directory number to be diverted only if none of the handsets are within the Home Zone, thereby avoiding unnecessary diversion costs.

A telephone system operating according to the invention requires a directory number common to all the handsets— the "virtual" fixed line number. This common number will typically be in a number series used for conventional fixed lines, so that calling parties can be billed at a standard fixed-line tariff, instead of the generally more expensive cellular tariffs.

In the preferred embodiment to be described, each mobile handset also has its own directory number (MSISDN). Each mobile handset therefore has its own mobile handset identity, but they share a common fixed-line identity. Therefore, a calling party can contact the users of the service either by using the mobile handset identity directly, or by using the common number. If the individual mobile handset number is used, that particular mobile handset will ring, wherever it is, (or the call will be diverted if that handset has call diversion set), and the calling party is charged the normal tariff for making a call to a mobile handset. However, if the common number is used, the call will be sent to one of the handsets currently in the Home Zone. If none are available in the Home Zone, the call may be diverted, but the calling party will still be charged at the reduced tariff, irrespective of the location of the mobile handsets. The additional cost of any such diversion would be borne by the called party, as is normal for such diversions. Effectively, any mobile handsets within the Home Zone act as substitutes for the fixed line telephone. Diversion takes place if no handset within the Home Zone answers, just as it would if a fixed phone does not answer.

Each handset, on being paged, may be identified as being currently in one of three conditions:
unreachable (e.g. out of radio contact or switched off)
in the Home Zone, that is, served by one of the base stations defining the Home Zone;
served by a base station other than one defining the Home Zone Note that for a handset which is "unreachable", its physical location within or outside the Home Zone does not need to be identified. The paging process does not identify, at this stage, whether a mobile handset is in use ("busy") and therefore unable to receive a call.

In the prior art system previously described, with only one handset, the single mobile handset is either reachable and within the Home Zone, or it is not. However, the introduction of second and further mobile handsets introduces further possibilities. In particular, two or more of the mobile handsets may be reachable within the Home Zone at the same time, or one or more handsets may be reachable within the Home Zone whilst one or more others are outside, or switched off.

In the embodiment to be described, a hierarchy of handsets is established, and the call is directed only to that handset, of those currently reachable within the Home Zone, that is highest in the hierarchy. Other solutions to the selection of which handset or handsets to call are also envisaged, however.

BRIEF DESCRIPTION OF THE DRAWINGS

An embodiment of the invention will now be discussed, by way of example, with reference to the Figures, in which.

DETAILED DESCRIPTION OF EXEMPLARY EMBODIMENTS

Figure 1:
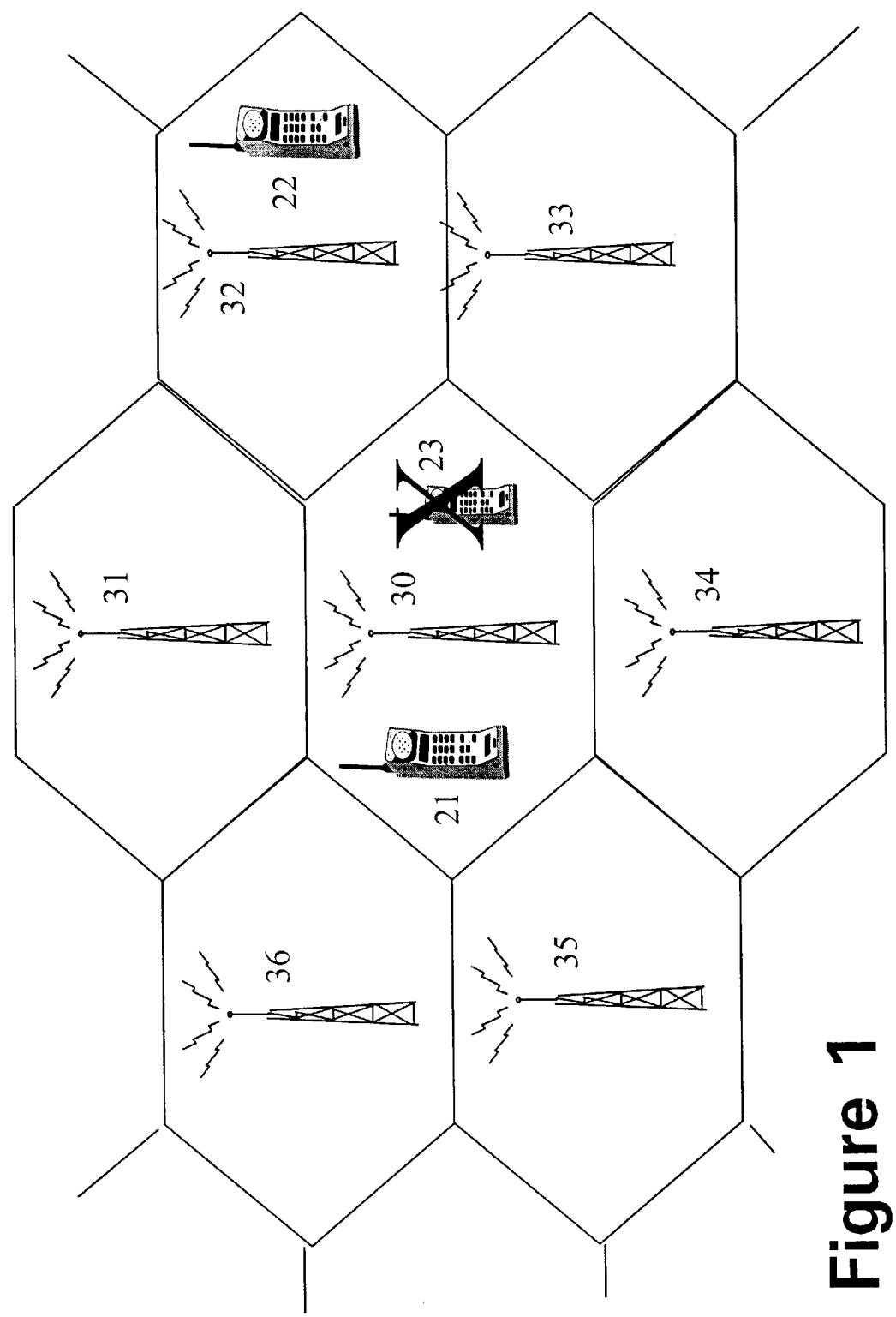
FIG. 1 illustrates the basic arrangement of a system according to the invention.

FIG. 1 shows part of a cellular radio system, including seven base stations 30–36. Each base station serves a respective cell. As discussed above, the cell served by each base station is defined as that zone in which the respective base station provides the best quality radio signal. If the base stations all have omnidirectional transmitters of similar power, and are arranged in a regular array, and if there are no topographical features to affect radio propagation, the cells will form a regular array as shown schematically in FIG. 1. However, in practice the cellular pattern is more complex. In particular, in areas where there is a greater demand for call traffic, and therefore of radio channels, the cells are made smaller (by using directional antenna and/or lower power transmitters, or by less elevated locations for the transmitters). This allows the radio channels used by each transmitter to be re-used by nearby transmitters without interference.

Also shown in FIG. 1 are three mobile telephone handsets 21,22,23. If a handset is active (switched on), the cell in which it is located is recorded in a database in the network known as the Home Location Register, in a manner to be described. A handset may move from one cell to another, in which case its new location will be identified by the base stations involved in the handover, and recorded in the Home Location Register.

In the example illustrated in FIG. 1, the mobile handsets 21 and 23 are located in cell 30, and mobile handset 22 is in cell 32. Mobile handset 23 is switched off, a condition indicated in the Figures of this specification by the letter "X".

The operation of this embodiment when a call is made to one of the mobile handsets using its normal cellular identity (MSISDN), or when a handset makes an outgoing call, is conventional, and such operation will not be discussed in detail, except where relevant to the invention.

For the purposes of illustrating the operation of the invention, it will be assumed that all three mobile handsets 21,22,23 are part of a calling group sharing a common "virtual" fixed-line number, and that the Home Zone defined for these handsets includes cell 30 but not cell 32.

Figure 2:
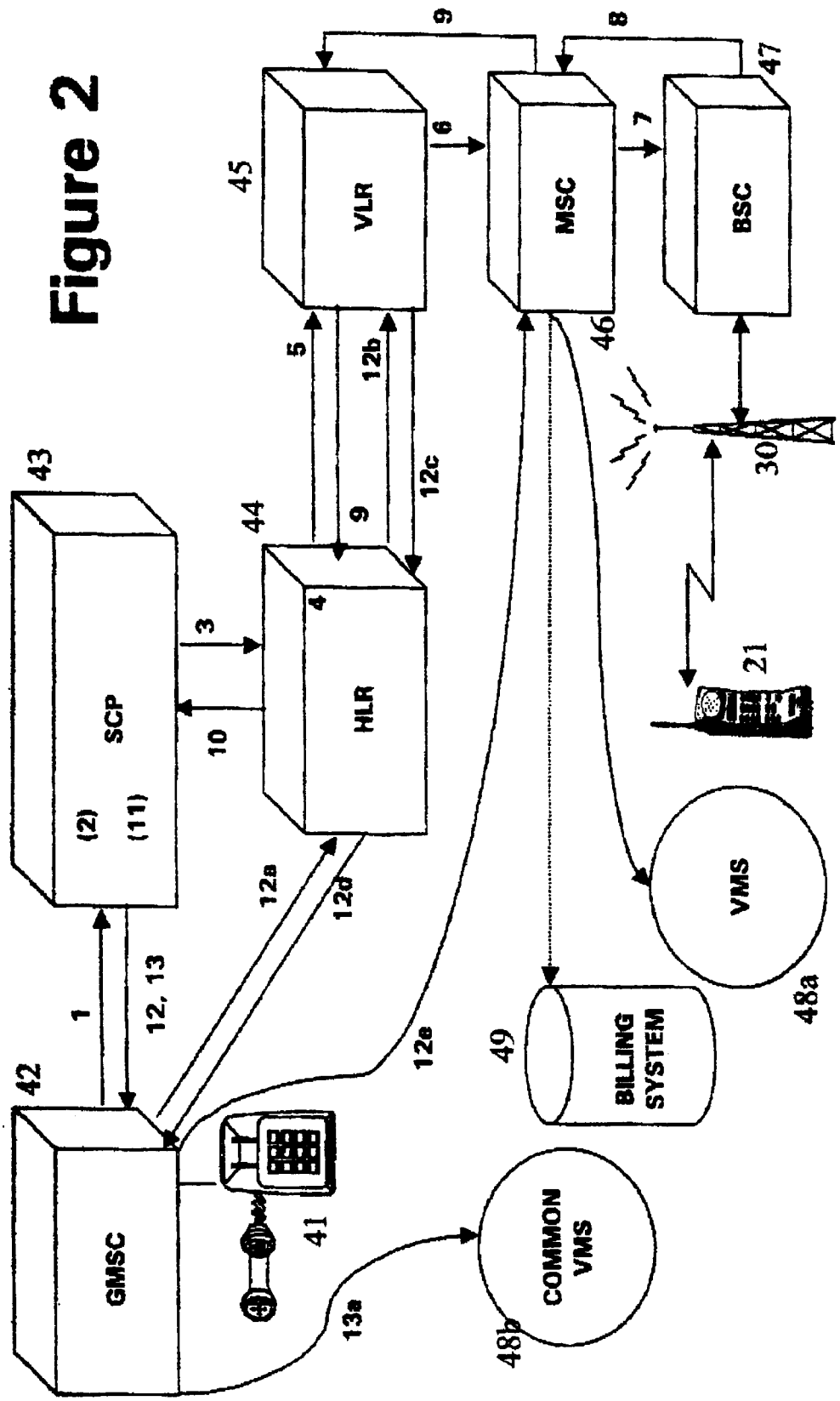
FIG. 2 illustrates schematically the basic arrangement of a typical cellular radio network, including information flows illustrating call set-up procedures.

First it is necessary to describe the basic layout of a typical cellular telephone system, and the processes by which the network determines the location of a mobile handset. FIG. 2 illustrates the components of the network architecture supporting this system. Connection with other networks, and ultimately from the calling party 41, is made through a "Gateway Mobile Switching Centre" (GMSC) 42, which is associated with the directory number (MSISDN) of the mobile handset 21 to be called. Calls to the mobile handset 21 are routed from the GMSC 42 by way of the mobile switching centre (MSC) 46 currently serving that handset 21. The MSC 46, in turn, routes the call to the base site controller (BSC) 47 controlling the base station 30 currently serving the mobile handset 21. This routing may go by way of another MSC (not shown), if the mobile handset is currently working to a base station 30 served by a MSC other than its "home" MSC 46. However, if the mobile handset is within its "Home Zone" it is likely to be served by its "Home" MSC.

A service control point (SCP) 43 associated with the Gateway MSC 42 controls the routing of the call. The SCP 43 uses data stored in a "Home Location Register" (HLR) 44, associated with the Gateway MSC 42, and also uses data stored in a "Visited Location Register" (VLR) 45 associated with the MSC 46 serving the mobile handset 21. These registers 44, 45 exchange data relating to the mobile unit 21, in particular relating to its location.

The Mobile Switching Centres (MSC) 42 and 46 control call diversion services, according to the current activities of the handset 21, and settings of the call diversion settings in the VLR 45. In appropriate circumstances, the Mobile Switching Centre 46 may direct that an incoming call be routed to a Voice Message Service (VMS) 48a, instead of to the mobile handset 21.

A billing system 49, associated with the MSC 46, generates billing information for charges incurred by the user of the handset 21.

Reference numerals 1 to 13a indicate the individual steps taken by the system when an incoming call takes place. Most of the operation of the system is conventional (steps 1 to 10 and 12 to 12e). The additional functions (steps 11, 13 and 13a) required to support the invention will be discussed as they arise. It will be noted that control of these functions is concentrated in the Service Control Point (SCP) 43.

Step 1 An incoming call arrives at the GMSC 42. If the number is not recognised, it is passed to the SCP 43 for translation.

Step 2 The SCP 43 next converts the number to an MSISDN.

Step 3 The SCP 43 forwards the MSISDN to the HLR 44, requesting the location (Cell) in which the Mobile handset 21 is currently located.

Step 4 The HLR 44 uses data currently stored therein to identify the VLR 45 in which the mobile handset 21 was last reported, either through the paging process about to be described, or by periodic location updates initiated by the mobile handset itself.

Step 5 The HLR 44 contacts the VLR 45, and requests the Cell Identification

Step 6 The VLR 45 forwards this request to the MSC 46 which was last reported as serving the mobile handset 21, Step 7 The MSC 46 pages the Mobile handset 21 (via the BSC 47 and antenna 30). This process involves the transmission of a signal to the mobile handset 21

Step 8 If the mobile handset 21 is switched on and in radio range, it responds with an answering transmission, and the BSC 47 returns a "Cell ID" signal to the MSC 46 indicating that the mobile handset is within the cell 30. (If the mobile handset 21 does not respond to the paging signal, the MSC 46 attempts to page it through other nearby base stations 31–36 and, if that also fails, through more remote base stations. If that also fails, the service control point (SCP) may initiate paging through other mobile switching centres (not shown). If the handset 21 cannot be reached at all, perhaps because it is switched off or out of radio range, a "not reachable" signal is returned to the SCP 43).

Step 9 The MSC 46 returns the location information received from the BSC 47 to the HLR 44, by way of the VLR 45.

Step 10 The HLR 44 returns the Cell ID to the SCP 43.

The operation of the system as described so far is conventional, except that, in this embodiment of the invention, the common "virtual fixed line" number is converted in Step 2 into two or more MSISDNs, which have been allocated a priority order, and steps 3 to 10 are then carried out for each MSISDN in turn, in order of their priority ranking.

In this embodiment, a further step (11), to be described in detail later, now takes place in the SCP. This step 11 determines whether the conventional steps 12 to 12e described below are to take place as in a conventional system, or whether an alternative course (steps 13, 13a) is to take place instead.

If it is determined that the call is to handled normally, the process continues as follows:

Step 12 the SCP 43 returns the MSISDN to the GMSC 42

Step 12a the GMSC 42 contacts the HLR 44 for the routing number (MSRN)—a code allowing routing of the call to the appropriate base station 30

Step 12b the HLR 44 contacts the VLR 45 for the MSRN

Step 12c the VLR 45 returns the MSRN to the HLR 44

Step 12d the HLR 44 returns the MSRN to GMSC 42

Step 12e the GMSC 42 connects the call to the MSC 46.

The MSC 46 then connects the call attempt, unless a call forwarding setting selected by the user and stored in the VLR 45 requires it to be forwarded elsewhere (step 12c). In cellular telephone systems four call-forwarding conditions are generally available:

Forward all Calls ("Unconditional forwarding")—activated without attempting to page the handset.

Call Forward when Not Reachable (handset switched off or out of range)—activated if paging is unsuccessful, without making a call attempt:

Call Forward when Busy ("engaged"):—activated without making a call attempt if paging is successful, but the handset is in use, Call Forward when no Answer:—activated if a call attempt is not answered within a predetermined period With the obvious exception of Unconditional Forwarding, any combination of these services may be selected.

Forwarding may be to another number, or to an answering service facility (VMS) 48a.

Figure 3:
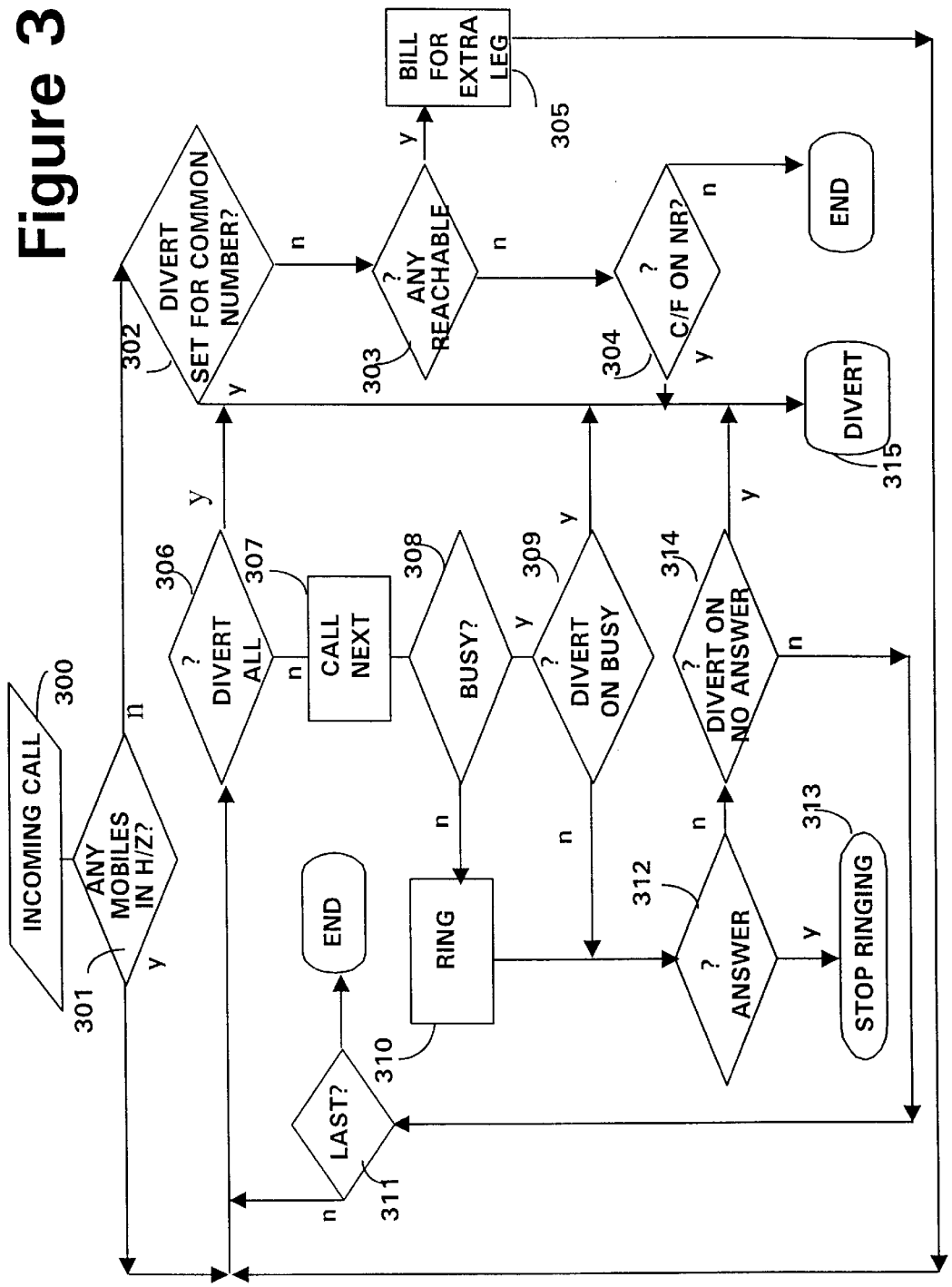
FIG. 3 shows a flowchart illustrating the operation of this embodiment when a calling party uses the common number.

In the embodiment of FIGS. 2 and 3, an additional step (Step 11) is made before returning the MSISDN to the MSC (step 12). In this additional step 11 the SCP 43 first compares the Cell ID with the Home Zone defined for that MSISDN. The decision made by the SCP 43 is based on the location of the handset 21 (specifically, whether the cell ID returned in step 10 corresponds with the Home Zone defined for the respective MSISDN). If the SCP 43 determines that the call should be connected to that MSISDN, the process continues through steps 12 to 12*e* above. If the call should not be connected (because the cell ID is not in the Home Zone) the next handset in priority order is investigated (return to step 3), and so on. If none of the MSISDNs return cell IDs within the Home Zone, the following steps take place:

Step 13 the SCP 43 translates the number to a pre-set Alternative Number (which would normally, but not necessarily, be either an answering service 48*b* or one of the MSISDNs, either specified explicitly, or as the MSISDN currently having priority "1"), and returns that number to the GMSC 42

Step 13*a* the GMSC routes the call to the alternative number. If the alternative number is one of the MSISDNs in the calling group, the steps 12 to 12*e* are performed for that MSISDN. If it is another MSISDN, the steps 1 to 12*e* are performed.

Calls routed to the answering service by the SCP (steps 13, 13*a*), because no handset is available in the Home Zone, are sent to an answering service address 48*b* associated with the common fixed line number. All users of handsets associated with the common fixed-line number have access to this answering service 48*b*. The common answering service box 48*b* may be dispensed with if messages can be deposited simultaneously in several answering service mailboxes 48*a*, each dedicated to one of the MSISDNs associated with the common fixed line number, but this would require simultaneous connection of one incoming call to multiple destinations.

It should be noted that calls diverted to the answering service by the MSC 46 as a result of diversions set for individual handsets are only sent to the answering service address 48*a* associated with that handset's MSISDN number, and are therefore only accessible by the user of that handset. Therefore, if a call to the common number were directed to a specified handset by the SCP 43 and MSC 46, and then further diverted to that handset's dedicated mailbox 48*a*, any message would be stored only in the dedicated mailbox 48*a* of the handset to which it is directed, and to which other users do not have access. Such a message would then need to be forwarded to the intended recipient by the actual recipient, if different. Alternatively, if privacy of calls made directly to the MSISDN number is not required, a handset may be arranged to that a "diversion to answering service" instruction diverts calls to the common answering service number 48*b*, instead of its own dedicated answering service 48*a*, allowing any user to access them.

As has already been mentioned, the SCP carries out the additional processes required to perform the invention. FIG. 3 illustrates the process by which an incoming call is handled by the SCP 43.

In a conventional fixed-line installation with several extension lines served by the same exchange line, the handsets connected to the extension lines all ring when the a call attempt is made to the exchange line, and any one of the handsets can answer the call. To achieve a system according to the invention which emulates this characteristic would require considerable modification to the SCP 43 and MSC 46. In particular, call attempts would have to be set up to two or more MSISDNs simultaneously, and these attempts would all have to cease when any one of them is answered. The call diversion services described above, which are controlled in the MSCs 46, would also require extensive adaptation if they were to operate in conjunction with such a system to avoid one handset causing the call to be diverted when another could have answered it. Furthermore, conventionally a call attempt fails if the base station is unable to make a traffic channel available for the call. In the present case, although the base station may make a call attempt to several mobile units, only one of them is to be connected so only one traffic channel needs to be available altogether, and not one for each mobile unit.

A system as just described would fall within the scope of the invention. However, the preferred embodiment, which will now be described, largely avoids the problems of substantial modification to the conventional system by only attempting to establish communication with one of the handsets within the Home Zone at any one time. Since only one handset is called at any one time, the system operates in the same way however many handsets are present within the Home Zone, and they cannot interfere with each other's operation. It also reduces the signalling load on the base station serving the Home Zone, which only has to handle one call attempt at a time.

This embodiment uses an arrangement in which one of the mobile handsets within the Home Zone has priority for incoming calls. This emulates a fixed system with several extensions less closely, but requires no modification or barring of call diversion services, or other changes to the MSC. This arrangement will now be explained in more detail.

The flow chart of FIG. 3 shows the processes performed by the network, (specifically processes 2 and 11 performed by the SCP 43—see FIG. 2), and diversion services performed by the MSC 46.

In this arrangement, each mobile handset is allocated a priority rating, stored in the Service Control Point 43. The more important the priority the lower the number. Any of the users can change the hierarchy by setting up a signalling session on the network. This causes its priority rating to change to "1". The mobile handset previously rated at "1" may exchange that priority rating with the handset which initiated the change. This process causes a signal to be sent to both handsets to cause them to display information of the change to both subscribers affected.

In an alternative arrangement, when a handset changes to priority "1", each handset currently having a priority value "n" numerically lower than that of the handset now changing to priority "1", changes to a priority value "n+1" in response. This involves more changes to the data stored in the SCP 43, and more advice messages to the handsets, but it ensures that a handset, having only recently seized top priority, does not drop to a very low priority on the next seizure, but declines stepwise.

Incoming call attempts are initially made only to the first member of the hierarchy currently in the Home Zone.

If an incoming call to the fixed-line number is received at the GMSC 42 (step 300) the SCP 43 translates the number into all the relevant MSISDNs (step 2, FIG. 2). The SCP 43 next ascertains, from data held in the network (specifically the Home Location Register (HLR) of the network), and by paging, the whereabout of each of the mobile stations (step 301)—see FIG. 2, steps 3 to 10. This process is conventional, as has been explained with reference to FIG. 2, except that in this case two or more mobile handsets have to be paged instead of just one. Therefore the SCP 43 must be modified to enable incoming calls to be translated into two or more different mobile handset numbers (MSISDN numbers). This may be done sequentially, starting with the highest priority number, and considering each of the others in turn if a page to the previous number does not find it in the Home Zone (or at all).

If any handsets are in the Home Zone (step 301) the SCP 43 returns the MSISDN number of the mobile handset in the Home Zone having the highest priority to the GMSC 42 (step 12, FIG. 2). This MSISDN number is used to set up a connection with that mobile handset (step 12*e*).

The interaction of this system with the call forwarding arrangements of the MSC 46 will now be described.

Unless it has "divert all calls" set (step 306), or the handset is busy (steps 307 to 308) and "Call Forward on Busy" is set (step 309), a call attempt is made to the selected handset (step 310). If the call is answered (step 312) ringing tone ceases and the call can proceed (step 313). If the call is not answered (step 312) and 'Call Forward on no Answer' is set (step 314) the incoming call will be call forwarded (step 312).

During the process of investigating the location of the mobile handsets, a 'not reachable' message is returned to the SCP for each mobile handset for which the paging is unsuccessful. Therefore if the current "Master" (priority 1) handset is not reachable, it is not identified as being within the Home Zone, and the next highest priority handset (priority 2) will be called instead (step 307). However, a mobile handset switched on in the Home Zone will always be called in preference to any other handset, regardless of its priority rating. Therefore the "Call forward when Not Reachable" service will not be invoked (step 304) if any handset is detected in the Home Zone.

If the call fails and no call forwarding has been set for the selected mobile unit, the SCP then attempts to call the other handsets in turn (step 311).

If the selected mobile unit has call forwarding set, there are two possibilities as to where the call can be forwarded. The first is to the answering service 48*a* of the selected mobile handset. This ensures that the incoming call is answered. However, the voice message is only stored in the mailbox of the mobile handset to which the call was directed. Therefore, the other mobile handsets receive no indication that an incoming call has occurred, and indeed one of the other mobile handsets may have been in a position to answer the call.

Alternatively, the mobile handset may have programmed the call forwarding to an alternative number, which could be one of the other mobile handsets. If the call is forwarded to another mobile handset which has itself also set call forwarding, the conditions set by that handset will also be honoured. This handset may, in turn have set "call forwarding to answering service".

If none of the mobile handsets is in the Home Zone when a calling party uses the common number, the call is handled according to the call-forwarding conditions set up for the common number (step 302). The users may wish to arrange that when no handset is reachable within the Home Zone, all incoming calls are diverted to a specified destination. This destination may be one of the MSISDN numbers associated with the common number (defined either by MSISDN number of priority number), or an answering service address 48*b* allocated to the common number, or some other number (step 315).

If an incoming call to the common number is call forwarded to the common answering service 48*b* any of the mobile handsets can retrieve the message. The SCP 43 may achieve this by storing the same message in each mobile handset's mailbox 48*a*. Each subscriber then has the ability to listen to the message, and respond if necessary. To alert the subscriber that a message has been received, a data message may be sent to each mobile handset, in conventional manner using for example the "SMS" service of the "GSM" cellular radio standard. This arrangement allows each user to retrieve messages made to the common fixed-line number. However, an incoming call for which the calling party has used the mobile handset number (MSISDN) is diverted only to that mobile handset's answering service, with no duplication sent to the other mobile handsets, thereby allowing private messages to be left.

If no divert is set for the common number (step 302) and no handset in the Home Zone is reachable, the call may be routed to the handset with the highest priority of those currently reachable outside the Home Zone (step 303). In this case, the billing system 49 is controlled to charge the common number account for the fixed-to-mobile leg of the call (step 305). The call processing then proceeds in all other respects in the same way as if the mobile handset to be called is within the Home Zone (steps 306 to 315).

If no handset is reachable (step 303), and "Call Forwarding on Not Reachable" is set for any of the mobile handsets, the call is forwarded according to the highest priority handset having set this service (step 304).

The user answering a call can transmit signals to the SCP 43 to cause transfer of the call, once answered, to another handset, or to set up a conference of three or more parties. The billing system 49 associated with the switching system may be arranged such that such transfers are made at no extra charge if the other handset is also within the Home Zone. When a user transmits such an instruction identifying the handset to which the transfer is to be made, the SCP 43 acts in accordance with any call forward conditions set up for the other user's MSISDN number. Therefore if the mobile handset to which the call is to be transferred has itself set a call forward to an alternative number, the call transfer attempt will be made to the alternative number. Therefore, if a call attempt transferred from Mobile handset A is not answered by Mobile handset B within a predetermined time, the call is redirected to the answering service of Mobile handset B. Mobile handset A can then complete the transfer, connecting the incoming call to the answering service of Mobile handset B, or terminate the transfer and return to the calling party. If the transfer is completed, Mobile handset A becomes idle, allowing it to make outgoing calls, and receive calls.

Any incoming call in which the calling party has used the common number is charged to the calling party at the Home Zone (fixed line) rate irrespective of diverts, transfers, or handset location. Transfers between the two mobile handsets, and conferences involving two or more handsets will be chargeable to the account of the person setting up such a service, but it is envisaged that such services could be tariff-free if the mobile handsets are within the Home Zone. Diverts can be charged to the mobile handset with which the diversion is associated, or to an account common to all the handsets. Diverts to the common answering service 48*b*, can also be charged to the common account, but if the message is only sent to one of the answering service mailboxes 48*a*, it is charged to the particular mobile handset account.

The service can replace a fixed line telephone with two or more mobile handsets, which can each act as the fixed line telephone for both incoming and outgoing calls even if the other is absent or switched off. Although the service can emulate a fixed line telephone by defining the same "Home Zone" for each handset, the invention also covers arrangements in which each of the handsets has a different Home Zone specified for it.

Each mobile handset can set up its own call-forwarding arrangement—either to another mobile handset or to the answering service, according to different conditions. It is therefore possible, for example, for one handset to arrange call-forwarding to the answering service, whilst another handset has arranged call forwarding to a third handset. It is also possible for two handsets to arrange call-forwarding to each other. Switching centres are conventionally arranged to disregard call-forward instructions which would send a call back to a handset to which the call has already been attempted, and similar propvision would be provided in this embodiment.

What is claimed is:

1. A mobile telephone network operating system for controlling the operation of a mobile telephone network having a plurality of mobile handsets and a plurality of base stations for serving the mobile handsets, the operating system comprising:

means for identifying the base station currently serving a mobile handset, and means for selectively routing incoming calls to the mobile handset or to another destination according to the location of the handset, wherein a plurality of handsets are associated with a single directory number, and a corresponding set of one or more radio base stations is associated with the directory number, and routing means for selectively routing call attempts to the directory number to one or more of said plurality of handsets currently being served by the one or more radio base stations in said set in preference over any other handset also associated to said single directory number but not being currently served by the one or more radio base stations in said set.

2. A network according to claim 1, having means for diverting calls to another destination if none of said handsets is currently served by a base station in said set.

3. A mobile telephone network operating system according to claim 2 wherein the routing means is arranged so that if none of said handsets is currently served by said set of base stations, it diverts incoming calls to one or more of the handsets associated with the directory number and currently served by a base station not forming part of said set.

4. A mobile telephone network operating system according to claim 1, wherein the routing means is arranged to set up simultaneous call attempts with a plurality of handsets on receiving a call request to the directory number associated with said handsets.

5. A mobile telephone network operating system according to claim 1, in which each handset associated with a given directory number is allocated a unique priority rating and the routing means is arranged to route calls to the handset having the highest priority rating, of those currently served by said set of base stations.

6. A mobile telephone network operating system according to claim 5, further comprising means for changing the relative priority ratings of two or more of the handsets.

7. A method of operating a mobile telephone system, the mobile telephone system having a plurality of mobile handsets and a plurality of base stations for serving the mobile handsets, the method comprising:

providing a plurality of handsets associated with a single directory number, associating a predetermined set of the plurality of radio base stations with the directory number, and selectively routing incoming calls to said directory number to one or more of said plurality of handsets currently served by radio base stations in the set in preference over any other handset also associated to said single directory number but not being currently served by the one or more radio base stations in said set.

8. A method according to claim 7, wherein calls are diverted to another destination if none of said handsets is currently served by any of said set of base stations.

9. A method according to claim 8 wherein if none of the handsets associated with a given directory number is currently served by said set of base stations, calls are diverted to one or more of the handsets associated with the directory number but currently served by a base station not forming part of said set.

10. A method according to claim 7, wherein simultaneous call attempts are made with a plurality of handsets on receiving a call request to the directory number associated with said handsets.

11. A method according to claim 7, in which each handset served by a given directory number is allocated a unique priority rating and calls are routed to the handset having the highest priority rating, of those currently served by said set of base stations.

12. A method according to claim 11, in which the relative priority ratings of two or more of the handsets may be changed.

* * * * *